3,511,848
CERTAIN 4-(ISOXAZOL-3 OR 5-YL)-PYRIDINIUM
SALTS
Victor John Bauer, Montvale, and Sidney Robert Safir,
River Edge, N.J., assignors to American Cyanamid
Company, Stamford, Conn., a corporation of Maine
No Drawing. Continuation-in-part of application Ser. No.
535,714, Mar. 21, 1966. This application Aug. 22, 1967,
Ser. No. 662,281
Int. Cl. C07d 31/32
U.S. Cl. 260—296          8 Claims

ABSTRACT OF THE DISCLOSURE

This application describes the preparation of isoxazolylpyridine compounds and also the corresponding isoxazolylpyridinium salts. These novel compounds are useful for their hypoglycemic activity.

---

This application is a continuation-in-part of application Ser. No. 535,714, filed Mar. 21, 1966, now abandoned.

SUMMARY OF THE INVENTION

This invention relates to new organic compounds, more particularly, it relates to isoxazolylpyridinium salts, intermediates for preparation of the salts and methods of preparing the same.

The new compounds of the present invention may illustrated by the following formula:

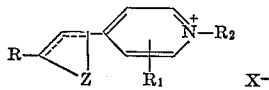

wherein R is selected from the group consisting of hydrogen, lower alkyl, and trihalo(lower)alkyl, $R_1$ is selected from the group consisting of hydrogen and lower alkyl, $R_2$ is selected from the group consisting of lower alkyl, lower alkenyl, cycloalkyl(lower)alkyl and lower alkoxy(lower)alkyl, Z is a trivalent radical selected from the group consisting of

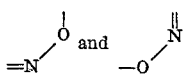

and X is a pharmaceutically acceptable anion. The anion may be, for example, chloride, bromide, iodide, and the like. The dotted line represents one double bond, the position of which is dependent upon the definition of Z. When Z is

the double bond is adjacent to R and when Z has the other meaning, the double bond is in the other position.

In general, the compounds are crystalline solids, soluble in water.

The compounds of the present invention may be prepared by either of two general reaction sequences. Thus, a 1-(4-pyridyl)-1,3-alkyldione or a 1-(4-pyridyl)-1,3-alkyldione salt is reacted with a hydroxylamine salt, such as the hydrochloride, in a polar solvent, such as water or alcohol, at a temperature of 25 to 100° C. for a time of one minute to twenty-four hours with or without the addition of a base, such as sodium carbonate, to provide either a 4-isoxazolylpyridine or a 1-(4-pyridyl)-1,3-alkyldione oxime. When an oxime is formed, it is converted to a 4-isoxazolylpyridine by treatment with a dehydrating agent, such as acetyl chloride or concentrated sulfuric acid, at a temperature of 0 to 100° C. for a time of one minute to twenty-four hours. The 4-isoxazolylpyridine is quaternized to a 4-isoxazolylpyridinium salt, a compound of this invention, by reaction with a lower alkyl, lower alkenyl, ar(lower)alkenyl, cycloalkyl(lower)alkyl, or lower alkoxy(lower)alkyl halide at a temperature of 0 to 150° C. with or without a solvent, such as alcohol, for a time of one minute to twenty-four hours in an open vessel or a sealed bomb. Alternatively, a 1-(4-pyridyl)-1,3-alkyldione is reacted with a lower alkyl halide at a temperature of 0 to 150° C. for a time of one minute to twenty-four hours with or without a solvent, such as alcohol, in an open vessel or a sealed bomb to form a quaternary salt, which is then cyclized with a hydroxylamine salt, such as the hydrochloride, in a polar solvent, such as water or alcohol, at a temperature of 25 to 125° C. for a time of one minute to twenty-four hours to a separable mixture of 4-(5-isoxazolyl)pyridinium salt and a 4-(3-isoxazolyl)pyridinium salt.

The intermediate isoxazolylpyridines before quaternization are new compounds and a part of the subject matter of the present invention. They may be illustrated by the following formula:

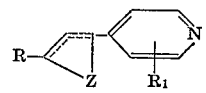

wherein R, $R_1$, and Z are as hereinbefore defined.

These reactions are illustrated schematically below.

Method A

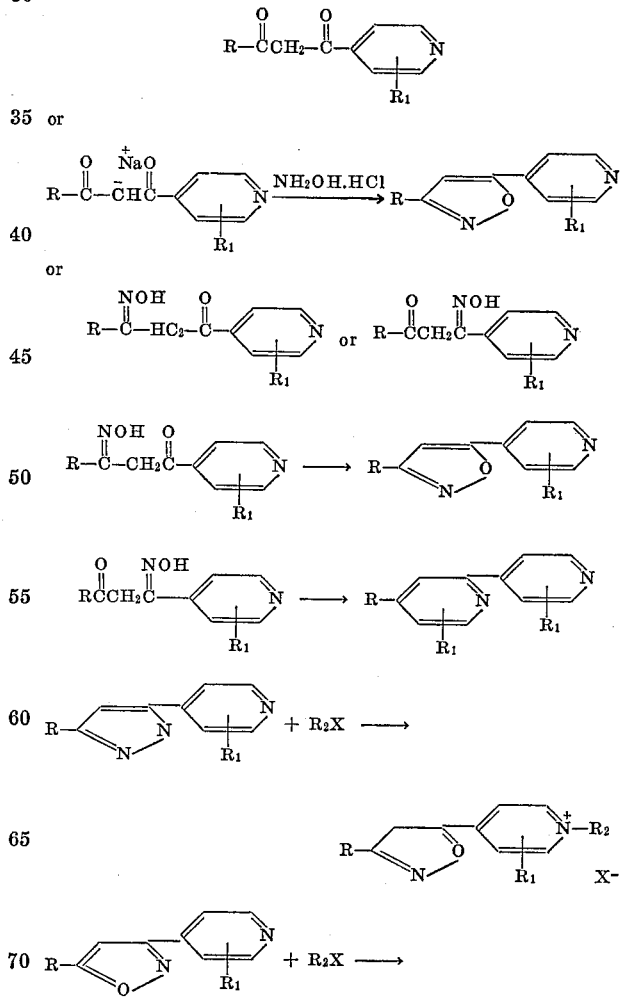

Method B

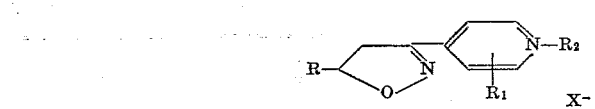

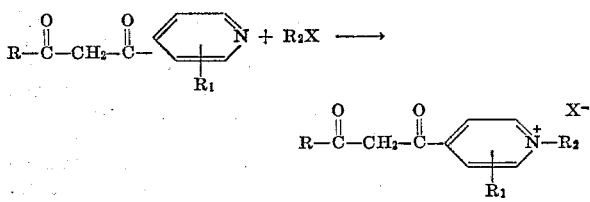

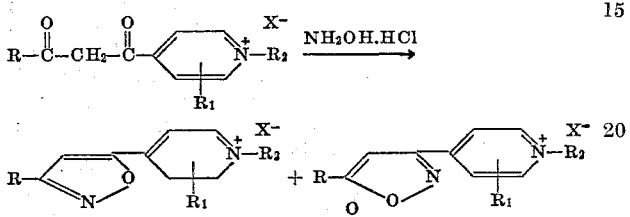

wherein R, R₁, R₂, and X are as defined above.

Among the compounds of the present invention are, for example:

4-(3-methyl-5-isoxazolyl)pyridine,
4-(3-ethyl-5-isoxazolyl)pyridine,
4-(3-cyclopropyl-5-isoxazolyl)pyridine,
4-(3-trifluoromethyl-5-isoxazolyl)pyridine,
4-(5-isoxazolyl)pyridine,
1-methyl-4-(3-ethyl-5-isoxazolyl)pyridinium chloride,
1-allyl-4-(3-methyl-5-isoxazolyl)pyridinium chloride,
1-methyl-4-(3-methyl-5-isoxazolyl)pyridinium chloride,
1-methyl-4-(5-methyl-3-isoxazolyl)pyridinium chloride,
1-cinnamyl-4-(3-methyl-5-isoxazolyl)pyridinium chloride,
1-cinnamyl-4-(5-isoxazolyl)pyridine iodide,
1-allyl-4-(5-ethyl-3-isoxazolyl)pyridinium chloride,
1-methyl-4-(3-cyclopropyl-5-isoxazolyl)pyridinium chloride,
1-methyl-4-(3-trifluoromethyl-5-isoxazolyl)pyridinium chloride,
1-(2-methoxyethyl)-4-(3-methyl-5-isoxazolyl)pyridium chloride,
1-cyclopropylmethyl-4-(3-methyl-5-isoxazolyl)pyridinium chloride,
1,3-dimethyl-4-(3-methyl-5-isoxazolyl)pyridinium chloride, and the like.

The compounds of the present invention show hypoglycemic activity. When the compounds are administered orally to normal mice, a reduction of blood sugar levels is observed. Mice used in these studies are MF–1 (Manor Farms, 18–25 grams). The compounds of this invention are administered by gavage as saline solutions. Control animals receive an equivalent volume of vehicle. Food is withheld from animals after dosing. Blood glucose is determined 2, 4, or 6 hours after dosing by the method of Hoffman [J. Biol. Chem., 120, 51 (1937)] as adapted to the Technicon Auto Analyzer[R] and is expressed as percent change from saline controls. Blood samples are obtained from the tail veins of mice. The testing data is summarized in Table I.

TABLE I.—DECREASE IN BLOOD GLUCOSE IN NORMAL MICE AFTER ORAL ADMINISTRATION OF ISOXAZOLYLPYRIDINIUM SALTS

| Compound | Hours after dosing | Percent decrease in blood glucose,* dose mg./kg. | | |
|---|---|---|---|---|
| | | 125 | 250 | 500 |
| 1-methyl-4-(3-methyl-5-isoxazolyl)-pyridinium chloride | 4 | 36±5 | 40±8 | 69±5 |
| 1-methyl-4-(3-ethyl-5-isoxazolyl)-pyridinium chloride | 4 | 24±3 | 44±7 | 63±7 |
| 1-allyl-4-(3-methyl-5-isoxazolyl)-pyridinium chloride | 4 | −11±9 | 9±8 | 39±4 |
| 1-methyl-4-(5-isoxazolyl)pyridinium chloride | 2 | 24±4 | 4±6 | 10±6 |
| | 4 | 24±2 | 4±8 | 25±2 |
| | 6 | 34±2 | 0±7 | 12±6 |
| 1,3-dimethyl-4-(3-methyl-5-isoxazolyl)-pyridinium chloride | 2 | 12±2 | 27±7 | 30±4 |
| | 4 | 14±10 | 36±13 | 76±8 |
| | 6 | 11±11 | 42±13 | 76±3 |
| 1-(2-methoxyethyl)-4-(3-methyl-5-isoxazolyl)pyridinium chloride | 2 | 18±7 | 26±3 | 30±7 |
| | 4 | −4±7 | 15±6 | 31±13 |
| | 6 | 7±9 | 9±7 | 22±11 |
| 1-methyl-4-(5-trifluoromethyl-3-3-isoxazolyl)pyridinium chloride | 2 | 7±7 | 27±2 | 6±8 |
| | 4 | 11±6 | 34±4 | 21±9 |
| 1-methyl-4-(5-methyl-3-isoxazolyl)-pyridinium chloride | 2 | 21±5 | 30±9 | 14±4 |
| | 4 | 40±4 | 57±8 | 53±11 |
| 1-cyclopropylmethyl-4-(3-methyl-5-isoxazolyl)pyridinium bromide | 2 | −8±10 | 10±8 | 10±5 |
| | 4 | −20±11 | 20±9 | 11±6 |
| 1-ethyl-4-(3-methyl-5-isoxazolyl)-pyridinium iodine | 2 | 10±2 | 14±6 | 3±4 |
| | 4 | | 16±5 | 20±7 |
| 1-ethyl-4-(3-ethyl-5-isoxazolyl)pyridinium-iodine | 2 | 22±4 | 15±5 | 24±1 |
| | 4 | 30±7 | 32±10 | 38±5 |
| 1-propyl-4-(3-methyl-5-isoxazolyl)-pyridinium bromide | 2 | −5±2 | 16±3 | 22±3 |
| | 4 | 5±4 | 13±5 | 17±5 |

* Values are means ± standard errors of 4 to 8 mice per dose and are expressed as percent decrease from predose values.

Oral hypoglycemic activity is also observed in other species. For example, 1-methyl-4-(3-methyl-5-isoxazolyl)pyridinium chloride, when administered to normal cockerels and guinea pigs causes a reduction in blood sugar levels. In addition, 1-methyl-4-(3-methyl - 5 - isoxazolyl) pyridinium chloride displays pronounced hypoglycemic activity in mice rendered experimentally hyperglycemic by an intravenous injection of alloxan. These results are recorded in Table II.

TABLE II.—ORAL HYPOGLYCEMIC ACTIVITY [1] OF 1-METHYL-4-(3 - METHYL-5-ISOXAZOLYL) PYRIDINIUM CHLORIDE IN COCKERELS, GUINEA PIGS AND ALLOXANIZED MICE

| Species and treatment | Dose, mmol/kg. | Time after dosing, hrs. | Percent reduction [2] in blood glucose |
|---|---|---|---|
| Cockerels drug (10) | 1.99 | 2 | [3] 43±4 |
| Guinea pigs, saline (10), drug (6). | 1.75 | 6 | 13±2 [3] 54±6 |
| Alloxanized mice, saline (28), drug (27). | 0.6 | 4 | 11±2 [3] 47±5 |

[1] Cockerels and guinea pigs were fasted 24 hours before dosing. Food was withheld from all animals after dosings.
[2] Values are means ± S.E. of number of animals indicated in parentheses and are expressed as percent reduction from predose levels or from saline control in the case of cockerels (blood glucose of 10 aline control cockerels was 143 ± 5 mg. percent).
[3] Significantly different from control.

These results show that the compounds of the present invention are useful in the lowering of blood glucose in normal and hyperglycemic warm-blooded animals at a dose of from 1 mg. to 500 mg. per kilogram of body weight.

The compounds of this invention can be used in compositions such as tablets; the principal active ingredient is mixed with conventional tableting ingredients such as corn starch, lactose, sucrose, sorbitol, talc, stearic acid, magnesium stearate, dicalcium phosphate, gums, and fractionally similar materials as pharmaceutical diluents or carriers. The tablets or pills of the novel compositions can be laminated or otherwise compounded to provide a dosage form affording the advantage of prolonged or delayed action or predetermined successive action of the enclosed medication. For example, the tablet or pill can comprise an inner dosage and an outer dosage component, the latter being in the form of an envelope over the former. The two components can be separated by an enteric layer which serves to resist disintegration in the stomach and permits the inner component to pass intact into the duodenum or to be delayed in release. A variety of materials can be used for such enteric layers or coatings, such materials including a number of polymeric acids or mixtures of polymeric acids with such materials as shellac, shellac and cetyl alcohol, cellulose acetate and the like. A particularly advantageous enteric coating comprises a styrene maleic acid copolymer together with known materials contributing to the enteric properties of the coating.

The liquid forms in which the novel composition of the present invention may be incorporated for administration include suitably flavored emulsions with edible oils, such as, cottonseed oil, sesame oil, coconut oil, peanut oil, and the like, as well as elixirs and similar pharmaceutical vehicles. Sterile suspensions or solutions are required for parenteral use. Isotonic preparations containing suitable preservatives are also highly desirable for injection use.

The term dosage form as described herein refers to physically discrete units suitable as unitary dosage for warm-blooded animal subjects, each unit containing a predetermined quantity of active material calculated to produce the desired therapeutic effect in association with the required pharmaceutical diluent, carrier or vehicle. The specifications for the novel dosage forms of this invention are dictated by and are directly dependent on (a) the unique characteristics of the active material and the particular therapeutic effect to be achieved, and (b) the limitations inherent in the art of compounding such an active material for therapeutic use in warm-blooded animals as disclosed in this specification, these being features of the present invention. Examples of suitable oral dosage forms in accord with this invention are tablets, capsules, pills, powder packets, granules, wafers, cachets, teaspoonfuls, dropperfuls, ampules, vials, segregated multiples of any of the foregoing and other forms as herein described.

DETAILED DESCRIPTION

The preparation of the compounds of this invention will be described in greater detail in conjunction with the following examples.

Example I

PREPARATION OF 4-(3-METHYL-5-ISOXAZOLYL) PYRIDINE

A solution of 22 g. (0.13 mole) of 4-acetoacetylpyridine, 14 g. of hydroxylamine hydrochloride, 14 g. of sodium carbonate, 150 ml. of water, and 100 ml. of ethanol is heated under reflux for 12 hours. Then, 100 ml. of solvent is allowed to distill from the mixture, which is then extracted with benzene. The benzene solution is concentrated under reduced pressure to a colorless solid. Recrystallization from cyclohexane provides 14 g. (66%) of colorless crystals, melting point 62–65° C.

$$\lambda_{max.}^{CH_3OH}\ 263\ m\mu$$

Example II

PREPARATION OF 4-(3-ETHYL-5-ISOXAZOLYL) PYRIDINE

A mixture of 40.5 g. (0.23 mole) of 1-(4-pyridyl)-1,3-pentanedione, 17.4 g. of hydroxylamine hydrochloride, 24.4 g. of sodium carbonate, 200 ml. of water, and 100 ml. of ethanol is heated under reflux for 18 hours. Then, 100 ml. of solvent is distilled, and the mixture is extracted with benzene. Concentration of the benzene solution leaves a red liquid which is crystallized from hexane to provide colorless crystals, melting point 48–49° C.

$$\lambda_{max.}^{CH_3OH}\ 264\ m\mu$$

Example III

PREPARATION OF 4-(5-ISOXAZOLYL)PYRIDINE

To a solution of 103 g. (0.6 mole) of 1-(4-pyridyl)-1,3-propanedione sodium salt in 500 ml. of water is added 44 g. of hydroxylamine hydrochloride. After several minutes, the solution is adjusted to pH 8 with sodium carbonate, and the solid which separates is collected. Recrystallization from methanol gives 52 g. of colorless crystals, melting point 152–153° C. dec., of 1-(4-pyridyl)-1,3-propanedione 3-oxime.

A mixture of 38 g. (0.22 mole) of 1-(4-pyridyl)-1,3-propanedione 3-oxime and 150 ml. of acetyl chloride is heated under reflux for 2 hours. The excess acetyl chloride is distilled, and the residue is taken up in water and made basic with sodium hydroxide. The mixture is extracted with ether. Concentration of the ether solution leaves a yellow solid, which is recrystallized from ether to give 11 g. of colorless crystals, melting point 101–102° C.

Example IV

PREPARATION OF 4-(5-TRIFLUOROMETHYL-3-ISOXAZOLYL)PYRIDINE

A solution of 2.2 g. (0.01 mole) of 1-(4-pyridyl)-4,4,4-trifluoro-1,3-butanedione, 0.7 g. of hydroxylamine hydrochloride, 20 ml. of ethanol, 5 ml. of water and 0.7 g. of sodium carbonate is heated under reflux for 12 hours, concentrated to a volume of 5 ml., and diluted with water. The solid which separates is recrystallized from isopropyl alcohol-water to provide 1.85 g. of colorless prisms, melting point 187° C., of 1-(4-pyridyl)-4,4,4-trifluoro-1,3-butane-diol 1-oxime.

To 25 ml. of concentrated sulfuric acid is added during 15 minutes with stirring 10.0 g. of 1-(4-pyridyl)-4,4,4-trifluoromethyl-1,3-butanedione 1-oxime. The solution is poured into ice water and made basic with 10 N sodium hydroxide. The solid which separates is collected and recrystallized from ethanol-water to provide colorless prisms, melting point 82–83° C.

Example V

PREPARATION OF 3-METHYL-4-(3-METHYL-5-ISOXAZOLYL)PYRIDINE

A solution of 13.2 g. (0.07 mole) of 4-acetoacetyl-3-methylpyridine, 5.9 g. of hydroxylamine hydrochloride, and 100 ml. of ethanol is heated under reflux for 18 hours, concentrated to a volume of 15 ml., diluted with water, made basic with sodium carbonate, and extracted with ether. The ether is evaporated and the residual oil is crystallized from pentane. Recrystallization from ether provides colorless crystals, melting point 87–88° C., $$\lambda_{max.}^{CH_3OH} \ 263 \ m\mu$$

Example VI

PREPARATION OF 1-METHYL-4-(3-METHYL-5-ISOXAZOLYL)PYRIDINIUM CHLORIDE

A mixture of 100 g. (0.62 mole) of 4-(3-methyl-5-isoxazolyl) pyridine and 350 ml. of methyl chloride is heated at 100° C. in a bomb for 15 hours. The excess methyl chloride is allowed to evaporate, and the residue is recrystallized from isopropyl alcohol to afford 56 g. (43%) of colorless crystals, melting point 248° C., dec., $$\lambda_{max.}^{CH_3OH} \ 293 \ m\mu$$

Example VII

PREPARATION OF 1-METHYL-4-(3-ETHYL-5-ISOXOZOLYL)PYRIDINIUM CHLORIDE

A mixture of 8.7 g. (0.05 mole of 4-(3-ethyl-5-isoxazolyl) pyridine and 10 ml. of methyl chloride is heated at 95° C. in a bomb for 17 hours. The excess methyl chloride is allowed to evaporate, and the residue is recrystallized from isopropyl alcohol to give colorless crystals, melting point 200–201° C. dec.

Example VIII

PREPARATION OF 1-ALLYL-4-(3-METHYL-5-ISOXAZOLYL)PYRIDINIUM CHLORIDE

A mixture of 10.0 g. (0.052 mole) of 4-(3-methyl-5-isoxazolyl) pyridine and 15 ml. of allyl chloride is heated at 80° C. in a bomb for 1½ hours. The excess allyl chloride is decanted from a dark oil which is formed, and the oil is crystallized from acetonitrile to give 6.5 g. of tan crystals, melting point 79–82° C. Recrystallization gives pale yellow needles, melting point 87° C. dec.

Example IX

PREPARATION OF 1-n-PROPYL-4-(3-METHYL-5-ISOXAZOLYL)PYRIDINIUM BROMIDE

A mixture of 3.2 g. (0.02 mole) of 4-(3-methyl-5-isoxazolyl) pyridine and 10 ml. of n-propyl bromide is heated in a bomb at 100° C. for 20 hours. The solid which forms is collected, washed with ether, and recrystallized from isopropyl alcohol to provide colorless crystals, melting point 180–182° C.

Example X

PREPARATION OF 1-ETHYL-4-(3-METHYL-5-ISOXAZOLYL)PYRIDINIUM IODIDE

A solution of 3.20 g. (0.02 mole) of 4-(3-methyl-5-isoxazolyl) pyridine, 4.5 g. of ethyl iodide, and 25 ml. of ethanol is heated under reflux for 2 hours, and then concentrated to dryness. The residue is crystallized from isopropyl alcohol to provide yellow crystals, melting point 193–194° C. dec.

Example XI

PREPARATION OF 1-CYCLOPROPYLMETHYL-4-(3-METHYL-5-ISOXAZOLYL)PYRIDINIUM BROMIDE

A solution of 3.20 g. (0.02 mole) of 4-(3-methyl-5-isoxazolyl) pyridine and 10 ml. of cyclopropylmethyl bromide is heated on a steam bath for ½ hour. Two layers form, and the lower layer is separated and recrystallized from acetonitrile to provide colorless crystals, melting point 165–166° C. dec.

Example XII

PREPARATION OF 1-(2-METHOXYETHYL)-4-(3-METHYL-5-ISOXAZOLYL)PYRIDINIUM CHLORIDE

A mixture of 3.2 g. (0.02 mole) of 4-(3-methyl-5-isoxazolyl) pyridine and 2 g. of 2-methoxyethyl chloride is heated on a steam bath for 19 hours. The mixture is treated with ether and the insoluble tarry residue is stirred with acetone to provide 2.4 g. of tan solid, melting point 72–77° C. Recrystallization from isopropyl alcohol provides off-white crystals, melting point 73–74° C., $$\lambda_{max.}^{CH_3OH} \ 293 \ m\mu$$

Example XIII

PREPARATION OF 1-CINNAMYL-4-(3-METHYL-5-ISOXAZOLYL)PYRIDINIUM CHLORIDE

A mixture of 1.3 g. (0.005 mole) of 4-(3-methyl-5-isoxazolyl) pyridine and 1.5 g. of cinnamyl chloride is heated at 85° C. for 45 minutes. The solid material is recrystallized from acetonitrile to provide straw-colored crystals, melting point 109–112° C.

Example XIV

PREPARATION OF 1-METHYL-4-(5-ISOXAZOLYL)PYRIDINIUM CHLORIDE

A mixture of 2.5 g. (0.017 mole) of 4-(5-isoxazolyl) pyridine and 20 ml. of methyl chloride is heated at 90° C. in a bomb for 20 hours. The excess methyl chloride is allowed to evaporate and the solid residue is recrystallized from acetonitrile to provide 2.2 g. (65%) of colorless crystals, melting point 182–183° C. dec.

Example XV

PREPARATION OF 1-METHYL-4-(5-ISOXAZOLYL)PYRIDINIUM IODIDE

A solution of 0.5 g. (0.003 mole) of 4-(5-isoxazolyl) pyridine, 3 ml. of methyl iodide, and 20 ml. of methanol is heated under reflux for 20 hours. The solvent is removed under reduced pressure and the residue is recrystallized from methanol to provide tan crystals, melting point 212–213° C. dec.

Example XVI

PREPARATION OF 1-ETHYL-4-(3-ETHYL-5-ISOXAZOLYL)PYRIDINIUM IODIDE

A solution of 3.5 g. (0.02 mole) of 4-(3-ethyl-5-isoxazolyl) pyridine, 4.5 g. of ethyl iodide, and 25 ml. of ethanol is heated under reflux for 2 hours, and then concentrated to an oil. Crystallization from isopropyl alcohol provides yellow crystals, melting point 154° C., dec.

Example XVII

PREPARATION OF 1-METHYL-4-(5-TRIFLUOROMETHYL-3-ISOXAZOLYL)PYRIDINIUM CHLORIDE

A mixture of 1.5 g. (0.007 mole) of 4-(5-trifluoromethyl-3-isoxazolyl)pyridine and 5 ml. of methyl chloride is heated in a bomb at 140° C. for 4 hours. The excess methyl chloride is allowed to evaporate, and the solid residue is recrystallized from isopropyl alcohol to provide colorless crystals, melting point 230° C., dec.

Example XVIII

PREPARATION OF 1,3-DIMETHYL-4-(3-METHYL-5-ISOXAZOLYL)PYRIDINIUM CHLORIDE

A mixture of 1.9 g. (0.011 mole) of 3-methyl-4-(3-methyl-5-isoxazolyl)pyridine and 20 ml. of methyl chloride is heated in a bomb at 90° C. for 18 hours. The excess methyl chloride is allowed to evaporate, and the solid residue is recrystallized from acetonitrile to provide colorless crystals, melting point 246–247° C., dec.

Example XIX
PREPARATION OF 1-n-PROPYL-4-(3-ETHYL-5-ISOXAZOLYL)PYRIDINIUM BROMIDE A solution of 3.5 g. (0.02 mole) of 4-(3-ethyl-5-isoxazolyl)pyridine and 10 ml. of n-propyl bromide is heated at 100° C. in a bomb for 18 hours. The excess n-propyl bromide is decanted from a tar which forms, and the latter is triturated with acetone to provide colorless crystals. Recrystallization from isopropyl alcohol-ether gives colorless needles, melting point 153° C.

Example XX
PREPARATION OF 1-METHYL-4-ACETOACETYL-PYRIDINIUM CHLORIDE

A mixture of 5.0 g. (0.03 mole) of 4-acetoacetylpyridine and 20 ml. of methyl chloride is heated at 95° C. in a bomb for 15 hours. The excess methyl chloride is allowed to evaporate, and the solid residue is washed with ether, leaving 4.9 g. of tan crystals, melting point 192-196° C. Recrystallization from isopropyl alcohol gives tan crystals, melting point 197-198° C., dec.

Example XXI
PREPARATION OF 1-METHYL-4-(5-METHYL-3-ISOXAZOLYL)PYRIDINIUM CHLORIDE A mixture of 100 g. (0.47 mole) of 1-methyl-4-acetoacetylpyridinium chloride, 35 g. of hydroxylamine hydrochloride, and 1.25 l. of ethanol is heated under reflux with stirring for 3 hours, stirred at room temperature for 18 hours and diluted with 2 l. of ether. The solid which separates is recrystallized from isopropyl alcohol-ether to provide 52 g. of colorless solid, melting point 100-120° C., dec. This solid is a 1:1 mixture of 1-methyl-4-(3-methyl-5-isoxaxolyl)pyridinium chloride and 1-methyl-4-(5-methyl-3-isoxazolyl)pyridinium chloride. The mixture is separated into two components by partition chromatography. The first eluted material is recrystallized from acetonitrile to provide colorless crystals, melting point 221-222° C., dec., of 1-methyl-4-(5-methyl-3-isoxazolyl)pyridinium chloride.

We claim:
1. An isoxazolylpyridinium salt of the formula:

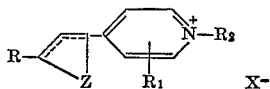

wherein R is selected from the group consisting of hydrogen, lower alkyl, and trifluoromethyl; $R_1$ is selected from the group consisting of hydrogen and lower alkyl; $R_2$ is selected from the group consisting of lower alkyl, lower alkenyl, [ar(lower)alkenyl], cyclopropyl(lower)alkyl and lower alkoxy(lower)alkyl; Z is trivalent radical selected from the group consisting of

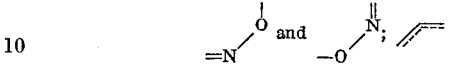

represents one double bond and X is a monovalent pharmaceutically acceptable anion.

2. The isoxazolylpyridinium salt according to claim 1: 1-methyl-4-(3-methyl-5-isoxazolyl(pyridinium chloride.

3. The isoxazolylpyridinium salt according to claim 1: 1-methyl-4-(3-ethyl-5-isoxazolyl)pyridinium chloride.

4. The isoxazolylpyridinium salt according to claim 1: 1-allyl-4-(3-methyl-5-isoxazolyl)pyridinium chloride.

5. The isoxazolylpyridinium salt according to claim 1: 1-methyl-4-(5-methyl-3-isoxazolyl)pyridinium chloride.

6. The isoxazolylpyridinium salt according to claim 1: 1 - methyl - 4 - (5 - trifluoromethyl - 3 - isoxazolyl)pyridinium chloride.

7. The isoxazolylpyridinium salt according to claim 1: 1,3-dimethyl-4-(3-methyl-5-isoxazolyl)pyridinium chloride.

8. The isoxazolylpyridinium salt according to claim 1: 1 - cyclopropylmethyl - 4 - (3 - methyl - 5 - isoxazolyl) pyridinium bromide.

References Cited
UNITED STATES PATENTS
2,929,819    3/1960    Erlenmeyer _____ 260—296

FOREIGN PATENTS
875,887    8/1961    Great Britain.

HENRY R. JILES, Primary Examiner

A. L. ROTMAN, Assistant Examiner

U.S. Cl. X.R.

260—297; 424—263